US010623296B2

(12) United States Patent
Haramaty et al.

(10) Patent No.: US 10,623,296 B2
(45) Date of Patent: Apr. 14, 2020

(54) NETWORK SWITCH OPERATING AS PACKET GENERATOR

(71) Applicant: MELLANOX TECHNOLOGIES TLV LTD., Ra'anana (IL)

(72) Inventors: Zachy Haramaty, Hemed (IL); Liron Mula, Ramat Gan (IL); George Elias, Tel Aviv (IL); Aviv Kfir, Nili (IL); Barak Gafni, Campbell, CA (US); Gil Levy, Hod Hasharon (IL); Benny Koren, Zichron Yaakov (IL); Itamar Rabenstein, Petach-Tikva (IL); Maty Golovaty, Ashdod (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 251 days.

(21) Appl. No.: 15/641,240

(22) Filed: Jul. 4, 2017

(65) Prior Publication Data
US 2018/0152372 A1    May 31, 2018

Related U.S. Application Data

(60) Provisional application No. 62/426,644, filed on Nov. 28, 2016.

(51) Int. Cl.
*H04L 12/26* (2006.01)
*H04L 12/18* (2006.01)
*H04L 12/939* (2013.01)
*H04Q 11/04* (2006.01)

(52) U.S. Cl.
CPC .......... *H04L 43/50* (2013.01); *H04L 12/1886* (2013.01); *H04L 49/55* (2013.01); *H04L 12/1877* (2013.01); *H04Q 11/0478* (2013.01)

(58) Field of Classification Search
CPC ..... H04L 43/50; H04L 12/1886; H04L 49/55; H04L 12/1877; H04Q 11/0478
See application file for complete search history.

(56) References Cited

U.S. PATENT DOCUMENTS

| 6,542,502 | B1 | 4/2003 | Herring et al. | |
| 7,751,421 | B2 | 7/2010 | Chi et al. | |
| 2004/0095890 | A1 | 5/2004 | Wang et al. | |
| 2006/0002305 | A1* | 1/2006 | Ginzburg | H04L 43/50 370/241 |
| 2013/0250762 | A1 | 9/2013 | Assarpour | |
| 2013/0294255 | A1 | 11/2013 | Olgaard et al. | |
| 2016/0337258 | A1 | 11/2016 | Attar et al. | |
| 2016/0373334 | A1* | 12/2016 | Gintis | H04L 43/50 |
| 2017/0163567 | A1 | 6/2017 | Roitshtein et al. | |

OTHER PUBLICATIONS

U.S. Appl. No. 15/186,557 office action dated Jan. 29, 2018.
Marelli et al., U.S. Appl. No. 15/186,557, filed Jun. 20, 2016.
U.S. Appl. No. 15/186,557 office action dated Apr. 23, 2018.

* cited by examiner

*Primary Examiner* — Eric Myers
(74) *Attorney, Agent, or Firm* — Kligler & Associates Patent Attorneys Ltd

(57) ABSTRACT

A method for packet generation includes designating a group of one or more ports, from among multiple ports of one or more network elements, to perform the packet generation. A circular packet path, which traverses one or more buffers of the ports in the group, is configured. A burst of one or more packets is provided to the group, so as to cause the burst of packets to repeatedly traverse the circular packet path. A packet stream, including the repeated burst of packets, is transmitted from one of the ports.

30 Claims, 2 Drawing Sheets

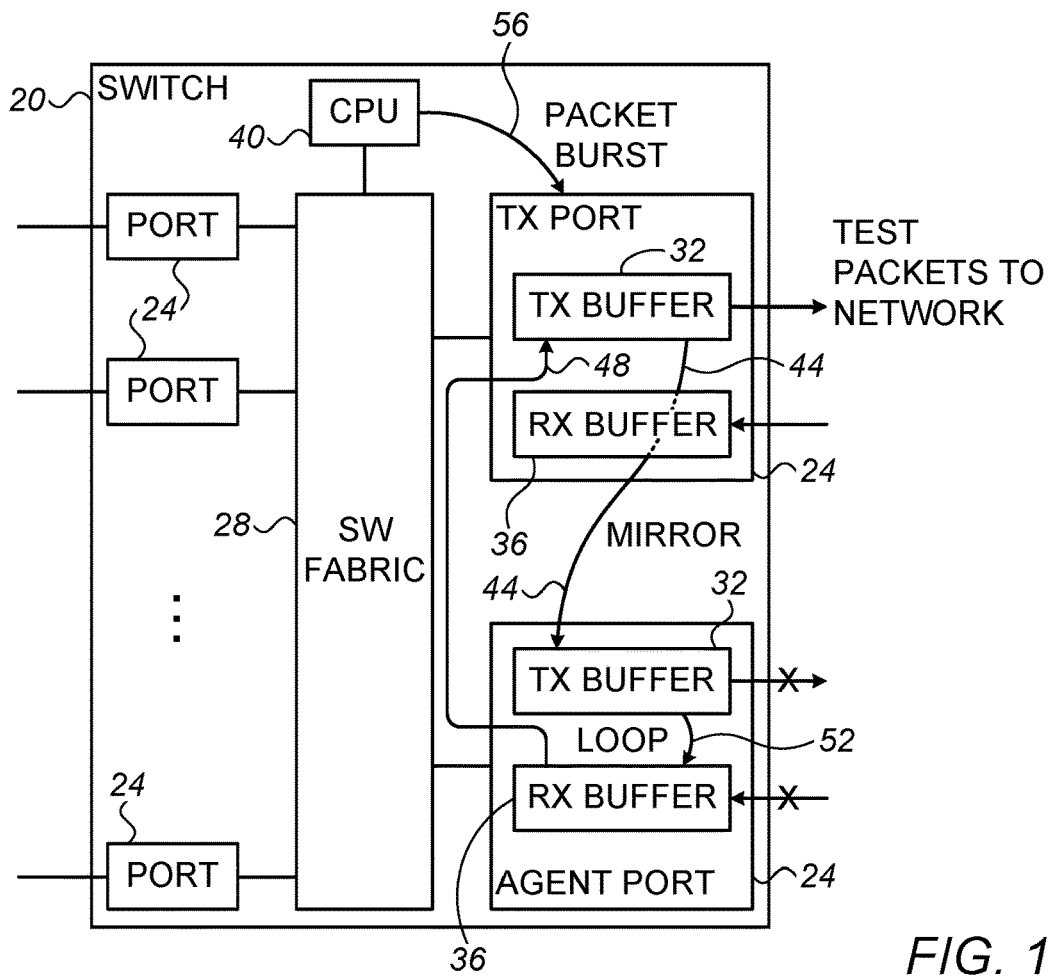
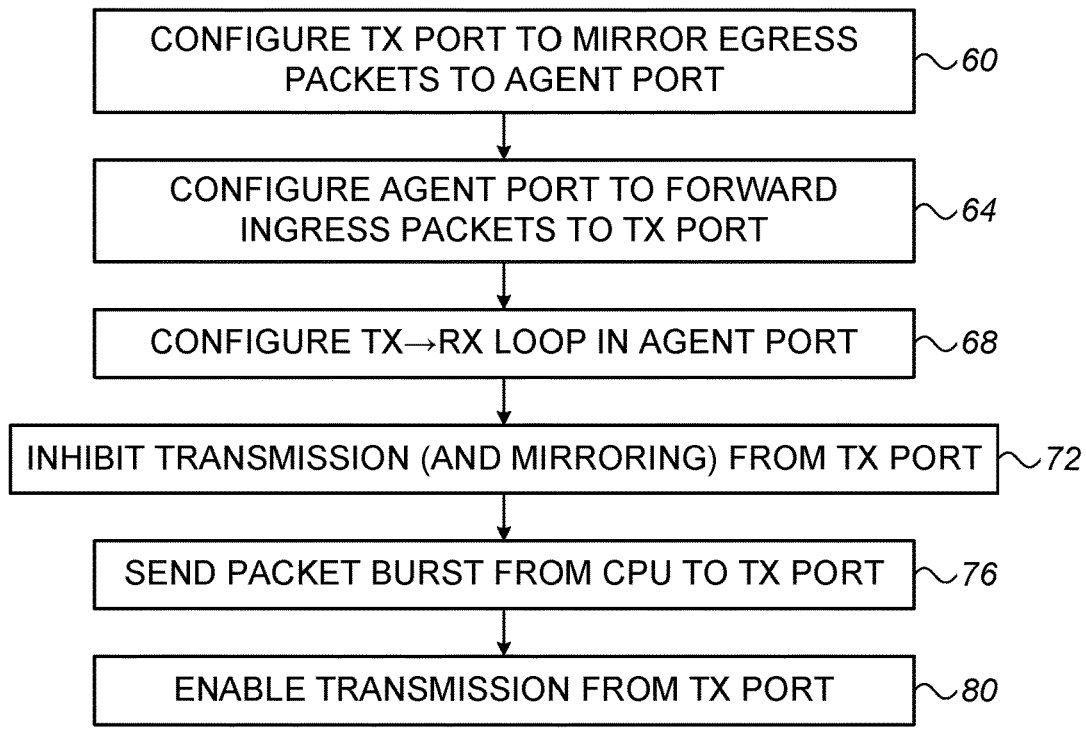

NETWORK SWITCH OPERATING AS PACKET GENERATOR

CROSS-REFERENCE TO RELATED APPLICATIONS

This application claims the benefit of U.S. Provisional Patent Application 62/426,644, filed Nov. 28, 2016, whose disclosure is incorporated herein by reference.

FIELD OF THE INVENTION

The present invention relates generally to packet network communication, and particularly to methods and systems for packet generation.

BACKGROUND OF THE INVENTION

A common practice in testing the capabilities and performance of a packet data network is to inject a high-speed stream of packets into the network and monitor how well the network forwards and handles the packets. Ideally, a network should be able to handle smoothly a stream of small data packets transmitted at the full wire speed of the network links, which can be in the tens of gigabits per second or even more. Generating packet traffic at this speed, however, typically requires dedicated, costly test equipment.

In place of a dedicated traffic generator of this sort, U.S. Patent Application Publication 2004/0095890 describes a switch with alternative operating modes, namely switching mode and traffic generation mode. The switch comprises a switch control module, a traffic generator control module, and a common platform. The switch control module is capable of receiving and forwarding packets, and the traffic generator control module is capable of generating instructions for traffic generation. A forwarding device receives packets from the switch control module, and forwards the packets to one or more network devices connected with one or more communication ports via a media access controlling device. A traffic generation device is capable of generating corresponding packets according to the instructions generated by the traffic generator control module, and forwards the packets to one or more of the communication ports via the media access controlling device.

As another example, U.S. Pat. No. 7,751,421 describes a switch in a data communications network for performing traffic generation in addition to standard switching and routing operations. The switch uses a fixed number of test packets retained in a conventional switch buffer to produce one or more infinite packet streams transmitted to a router under test (RUT). The switching device enqueues packets in the priority queues, dequeues the packets from the priority queues, transmits the dequeued packets to the RUT, and re-enqueues a copy of the dequeued packets into the priority queues from which they were dequeued. The enqueued packets and associated pointers to packets are organized into linked lists. By re-writing a copy of each dequeued packet to the tail of a linked list and updating the pointers, the switch produces repeatable streams of test packets. The priority buffers, without the re-write operation, may also be used for conventional egress traffic.

SUMMARY OF THE INVENTION

An embodiment of the present invention that is described herein provides a method for packet generation. The method includes designating a group of one or more ports, from among multiple ports of one or more network elements, to perform the packet generation. A circular packet path, which traverses one or more buffers of the ports in the group, is configured. A burst of one or more packets is provided to the group, so as to cause the burst of packets to repeatedly traverse the circular packet path. A packet stream, including the repeated burst of packets, is transmitted from one of the ports.

In some embodiments, the method further includes inhibiting packet transmission from the group before providing the burst to the group, and re-enabling the packet transmission after providing the burst.

In an embodiment, configuring the circular packet path includes (i) configuring a first port in the group to duplicate and send egress packets to a second port in the group, (ii) configuring a loop path from an output of a transmission (TX) buffer of the second port to an input of a reception (RX) buffer of the second port, and (iii) configuring the second port to forward packets from an output of the RX buffer to the first port.

In another embodiment, configuring the circular packet path includes (i) configuring a second port in the group to duplicate and send packets to a first port in the group, (ii) configuring a first loop path from an output of a transmission (TX) buffer of the second port to an input of a reception (RX) buffer of the second port, and (iii) configuring a second loop path from an output of the RX buffer of the second port to an input of the TX buffer of the second port.

In yet another embodiment, the method includes adding one or more packets to the burst, while the burst is traversing the circular packet path and the packet stream is being transmitted. In still another embodiment, providing the burst includes replicating the burst that is provided to the group, so as to transmit the packet stream at wire-speed. In a disclosed embodiment, the method includes configuring the circular packet path to modify a packet field value between first and second occurrences of the burst in the packet stream.

In an embodiment, the method includes configuring a hardware component to stop transmission of the packet stream after a predefined number of packets. In another embodiment, designating the group includes designating at least first and second groups of ports for generating multiple packet streams, such that at least a given port is shared between the first and second groups.

In some embodiments, transmitting the packet stream includes transmitting both the packet stream and user packets via a same port. The method may include applying to the packet stream a shaping operation that limits a maximal transmission rate of the packet stream. In an embodiment, the group consists of a single port. In an embodiment, transmitting the packet stream includes arbitrating, in a given port of the group, between the packets of the packet stream and user packets.

There is additionally provided, in accordance with an embodiment of the present invention, an apparatus for packet generation, including multiple ports belonging to one or more network elements, and packet processing circuitry. The packet processing circuitry is configured to (i) designate a group of one or more ports, from among the multiple ports, to perform the packet generation, (ii) configure a circular packet path that traverses one or more buffers of the ports in the group, (iii) provide to the group a burst of one or more packets, so as to cause the burst of packets to repeatedly traverse the circular packet path, and (iv) transmit a packet stream, including the repeated burst of packets, from one of the ports.

There is further provided, in accordance with an embodiment of the present invention, a computer software product, the product including a tangible non-transitory computer-readable medium in which program instructions are stored, which instructions, when read by a processor in one or more network elements having multiple ports, cause the processor to (i) designate a group of one or more ports, from among the multiple ports, to perform packet generation, (ii) configure a circular packet path that traverses one or more buffers of the ports in the group, (iii) provide to the group a burst of one or more packets, so as to cause the burst of packets to repeatedly traverse the circular packet path, and (iv) transmit a packet stream, including the repeated burst of packets, from one of the ports in the group.

The present invention will be more fully understood from the following detailed description of the embodiments thereof, taken together with the drawings in which:

BRIEF DESCRIPTION OF THE DRAWINGS

FIG. 1 is a block diagram that schematically illustrates a network switch operating as a packet generator, in accordance with an embodiment of the present invention;

FIG. 2 is a flow chart that schematically illustrates a method for packet generation in the network switch of FIG. 1, in accordance with an embodiment of the present invention;

DETAILED DESCRIPTION OF EMBODIMENTS

Overview

Figure 3:
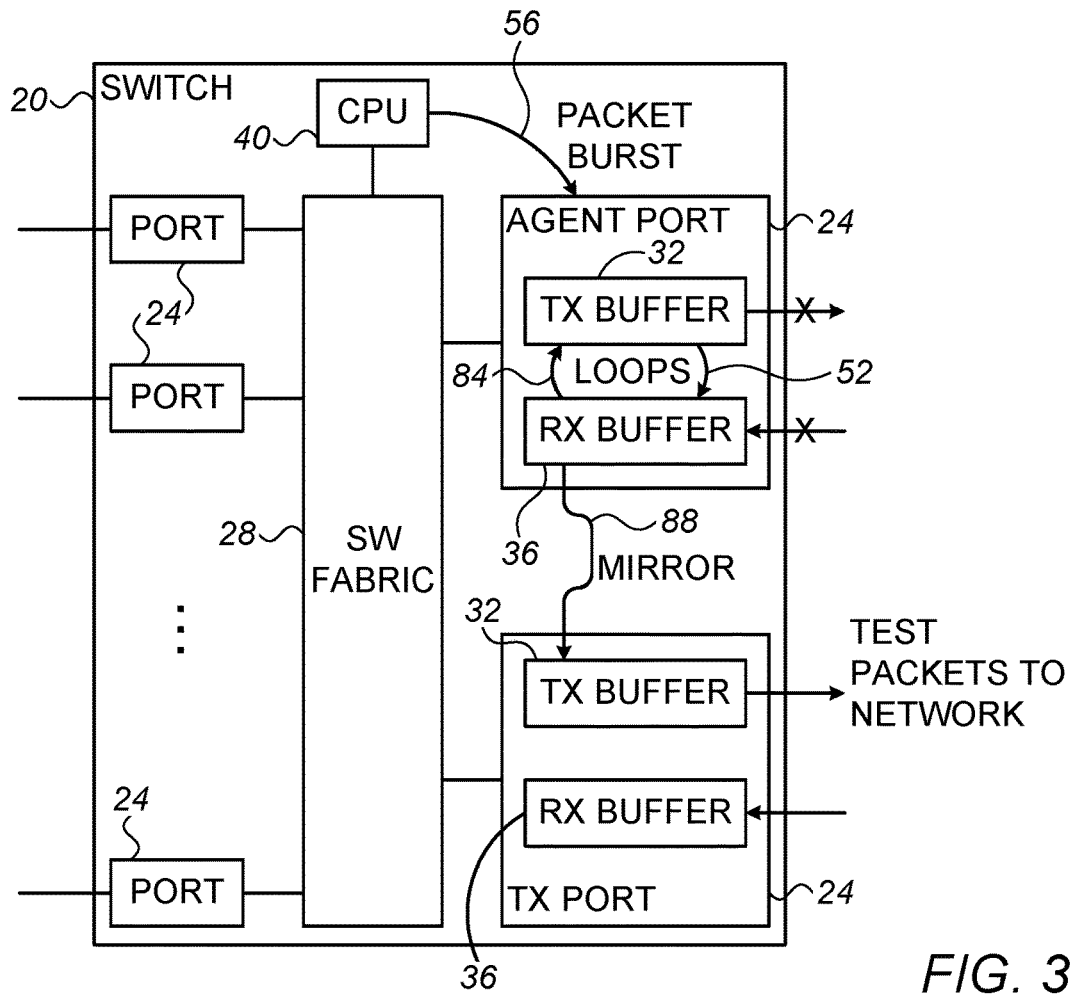
FIG. 3 is a block diagram that schematically illustrates a network switch operating as a packet generator, in accordance with an embodiment of the present invention.

Embodiments of the present invention that are described herein provide improved methods and systems for generating streams of communication packets, e.g., test packets for testing a network or network elements. In the disclosed embodiments, a packet stream is generated by an existing network switch in the network, eliminating the need for dedicated test equipment.

Typically, the network switch comprises multiple ports for transmitting and receiving packets to and from the network. Each port typically comprises a reception (RX) buffer for buffering incoming packets, and a transmission (TX) buffer for buffering outgoing packets. The switch further comprises packet processing circuitry, e.g., a switch fabric and a Central Processing Unit (CPU).

In some embodiments, a group of one or more ports of the switch is designated for generating a packet stream. Most of the embodiments described herein refer to a group of two ports, denoted a TX port (via which the generated packet stream is transmitted) and an agent port. In some embodiments, however, the group may comprise a single port.

In some embodiments, the CPU configures the designated group of ports by performing the following operations:
  i. Configure a circular packet path that traverses one or more of the RX and/or TX buffers of the ports in the group.
  ii. Temporarily inhibit packet transmission from the group, or at least from one of the ports in the group.
  iii. Send a burst of one or more packets to the group.
  iv. Re-enable packet transmission.

Following this sequence of operations, the burst of packets traverses the circular packet path repeatedly. The resulting packet stream is transmitted from one of the ports in the group, e.g., into the network. Several possible implementations of the above scheme are explained in detail herein.

It should be noted that it is not mandatory to inhibit the transmission of packets while initially sending the burst of packets to the group. In other words, steps (ii) and (iv) above are optional. The objective of these steps is to ensure that the order of packets in the burst is maintained. If it is permissible to change the order of packets in the burst, for example if the burst consists of a single packet or multiple copies of the same packet, these steps can be omitted. Additionally or alternatively, in some embodiments, one or more packets are added to the burst at a later stage, while the burst is already circling in the circular packet path and the packet stream is being transmitted.

The disclosed techniques enable a network switch to generate packet streams using the same hardware used for normal processing of packets, i.e., no additional hardware is needed for the sake of packet generation. At the same time, the disclosed techniques enable generation of long and complex streams of packets at wire-speed, and therefore facilitate high-quality testing.

System Description

FIG. 1 is a block diagram that schematically illustrates a network switch 20 operating as a packet generator, in accordance with an embodiment of the present invention. Network switch 20 is typically part of a communication network (not shown in the figure), and may operate in any suitable type of network and in accordance with any suitable communication protocol, e.g., Ethernet or Infiniband.

Network switch 20 (also referred to simply as "switch" for brevity) comprises a plurality of ports 24, also referred to as interfaces. Ports 24 are used for sending and receiving packets. Each port 24 is typically connected to a respective network link that connects to a port of another network element or to a client computer, for example.

In the present example, switch 20 comprises a hardware-implemented switch fabric 28, which is configurable to forward packets between ports 24. Each port 24 comprises a respective transmission (TX) buffer 32 for buffering outgoing packets pending for transmission from the port, and a respective reception (RX) buffer 36 for buffering incoming packets that enter via the port. Buffers 32 and 36 are also referred to as TX and RX queues, respectively.

Switch 20 further comprises a Central Processing Unit (CPU) 40, also referred to as a processor. Among other tasks, CPU 40 typically configures fabric 28 with the appropriate forwarding scheme, and generally manages the operation of switch 20. In some embodiments, CPU 40 also carries out the packet generation methods described herein.

Generation of Test Packet Streams in Network Switch

In some embodiments, CPU 40 generates a stream of packets using a designated group of ports 24, and without additional dedicated hardware. FIG. 2 below describes one possible packet generation method, with reference to the switch configuration of FIG. 1. An alternative switch configuration shown in FIG. 3 below, and the corresponding packet generation method is described in FIG. 4. Yet additional schemes are described further below.

FIG. 2 is a flow chart that schematically illustrates a method for packet generation in the network switch configuration of FIG. 1, in accordance with an embodiment of the present invention. In this example, the designated group of ports comprises two ports 24, referred to as a "TX port" and an "agent port". Since no dedicated hardware is involved, CPU 40 may choose any of ports 24 to serve as the TX port and agent port.

At a TX port configuration step 60, CPU 40 configures the TX port to mirror the packets it transmits (the egress packets exiting TX buffer 32 of the TX port) to the agent port. In the present example, switch 20 supports Switched Port Analyzer (SPAN) port mirroring, and CPU 40 configures the TX port to mirror the egress packets to the agent port using SPAN. Alternatively, any other suitable mirroring mechanism may be used. The mirroring configuration is marked with an arrow 44, labeled "MIRROR", in FIG. 1. The mirrored packets are provided to the input of TX buffer 32 of the agent port.

At an agent port configuration step 64, CPU 40 configures the agent port to forward the packets it receives (the ingress packets exiting RX buffer 36 of the agent port) to the TX port. This forwarding may be configured in the agent port itself, or in fabric 28. The forwarding configuration is marked with an arrow 48 in FIG. 1. The forwarded packets are provided to the input of TX buffer 32 of the TX port.

At a loop configuration step 68, CPU 40 configures a TX-to-RX loop 52 in the agent port. With this configuration, the packets exiting TX buffer 32 of the agent port are sent to the input of RX buffer 36 of the agent port. In some embodiments, loop 52 is configured internally to the agent port using a suitable hardware path. In other embodiments, loop 52 is configured externally to the agent port, e.g., using a suitable cable.

At this stage, CPU 40 has set-up a circular packet path via the TX port and the agent port:
  i. Any packet that is sent to the TX port for transmission will pass through TX buffer 32 of the TX port.
  ii. Since the TX port has been configured to mirror egress packets from the output of its TX buffer to the agent port (step 60), the TX port will send a copy of the packet to input of TX buffer 32 of the agent port.
  iii. From the output of TX buffer 32 of the agent port, the packet will pass to the input of RX buffer 36 of the agent port (via loop 52 configured at step 68).
  iv. Since the agent port has been configured to forward received packets to the TX port (step 64), the agent port will send the packet back to the input of TX buffer 32 of the TX port.

At an (optional) inhibiting step 72, CPU 40 temporarily disables packet transmission (including mirroring) from the TX port. At a burst sending step 76, CPU 40 sends a burst of one or more packets to the TX port. (The burst is typically sent by the CPU once, not repetitively.) Since packet transmission from the TX port has been inhibited, the burst of packets is buffered in TX buffer 32 of the TX port. The burst is not transmitted out of the switch, and does not circulate around the circular packet path.

In implementations in which step 72 is performed, CPU 40 typically waits until the entire packet burst is buffered in TX buffer 32 of the TX port, and then re-enables packet transmission (including mirroring) from the TX port, at a re-enabling step 80. From this point, the burst of packets repeatedly traverses the circular packet path as explained above. The order of the packets in the burst is preserved. In addition, any packet exiting TX buffer 32 of the TX port is also transmitted from the port, e.g., to the network.

Thus, the TX port transmits a periodic stream of packets that comprises successive repetitions of the packet burst. For example, if the packet burst provided by CPU 40 consists of three packets {A, B, C}, the stream of packets will be of the form {A, B, C, A, B, C, A, B, C, . . . }. Transmission of the stream of packets continues until stopped, e.g., by the CPU.

FIG. 3 is a block diagram that schematically illustrates an alternative configuration of network switch 20, for operating as a packet generator, in accordance with another embodiment of the present invention. In this configuration, the circular packet path comprises only TX buffer 32 and RX buffer 36 of the agent port. For setting-up this circular packet path, an RX-to-TX loop 84 is configured between the output of RX buffer 36 and the input of TX buffer 32 of the agent port, in addition to TX-to-RX loop 52. With this configuration, the packets exiting RX buffer 36 of the agent port are sent to the input of TX buffer 32 of the agent port. Loop 84 is typically configured internally to the agent port using a suitable hardware path.

In the configuration of FIG. 3, CPU 40 sends the burst of packets to the agent port. The burst repeatedly traverses the circular packet path in the agent port. In addition, CPU 40 configures the agent port to mirror received packets to the TX port (e.g., using SPAN). The mirroring configuration is marked with an arrow 88, labeled "MIRROR", in FIG. 3. The resulting packet stream is transmitted from the TX port.

In the example of FIG. 3 the mirroring (arrow 88) is performed from the output of RX buffer 36 of the agent port. Alternatively, the mirroring may be performed from another suitable (e.g., accessible) point along the circular packet path, for example from the input of TX buffer 32 of the agent port.

In alternative embodiments, CPU 40 may replace some of the loop and mirroring operations with multicast forwarding. In this context, both mirroring and multicast forwarding are regarded as ways of duplicating a packet and sending the duplicates to two or more destinations. In the example of FIG. 3, CPU 40 may configure the switch to forward packets exiting RX buffer 36 of the agent port using multicast to the agent port itself (effectively implementing loop 84) and to the TX port (effectively implementing mirroring path 88). CPU 40 may configure the multicast forwarding in the agent port itself, or in fabric 28.

When using multicast, it is also possible to transmit the same packet stream from multiple different TX ports (all using the packet burst circulating in of the same agent port). In this embodiment, CPU 40 may configure the switch to forward packets exiting RX buffer of the agent port using multicast (i) to the agent port itself, and (ii) to the multiple TX ports. In this embodiment, the multicast loopback filter should be disabled.

Figure 4:
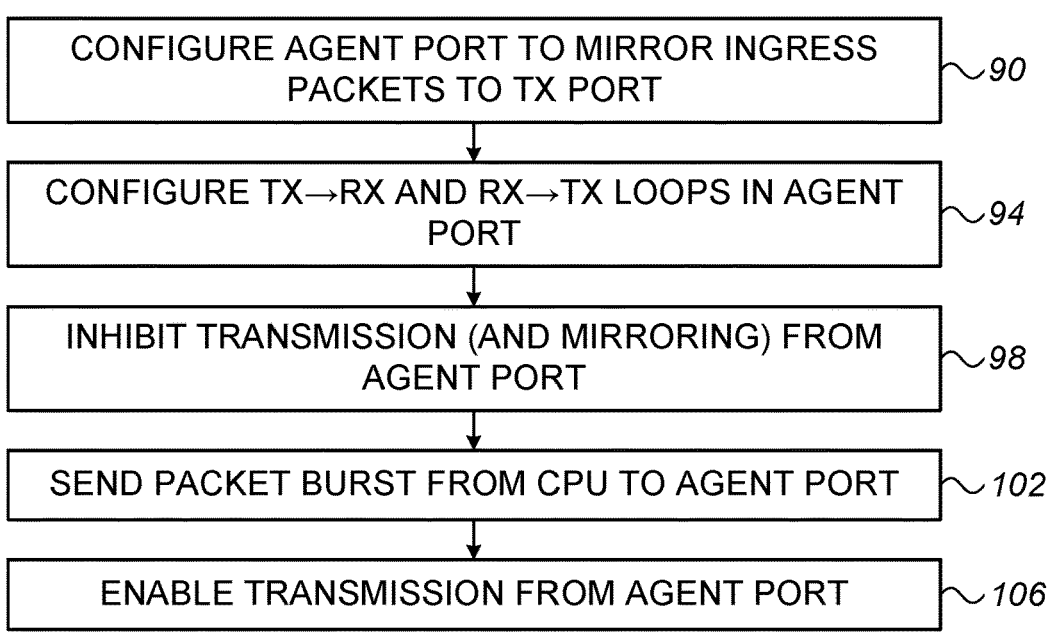
FIG. 4 is a flow chart that schematically illustrates a method for packet generation in the network switch of FIG. 3, in accordance with an embodiment of the present invention.

FIG. 4 is a flow chart that schematically illustrates a method for packet generation in the network switch of FIG. 3, in accordance with an embodiment of the present invention. At mirroring configuration step 90, CPU 40 configures the agent port to mirror the packets it transmits (the ingress packets exiting TX buffer 32 of the agent port) to the TX port. As noted above, this configuration sets-up mirroring path 88 seen in FIG. 3. Alternatively, other mirroring schemes can be used.

At a loop configuration step 94, CPU 40 configures the circular packet path that comprises TX-to-RX loop 52 and RX-to-TX loop 84 in the agent port. With this configuration:
  i. Any packet that is sent to the agent port will pass through TX buffer 32 of the agent port.

ii. From the output of TX buffer 32 of the agent port, the packet will pass to the input of RX buffer 36 of the agent port (via loop 52 configured at step 94).

iii. From the output of RX buffer 36 of the agent port, the packet will pass to the input of TX buffer 32 of the agent port (via loop 84 configured at step 94).

iv. Since the agent port has been configured to forward ingress packets to the TX port (step 90), the agent port will send a copy of the packet to the input of TX buffer 32 of the agent port.

At an (optional) inhibiting step 98, CPU 40 temporarily disables packet transmission (including mirroring) from the agent port. At a burst sending step 102, CPU 40 sends a burst of one or more packets to the agent port. Since packet transmission from the agent port has been inhibited, the burst of packets is buffered in TX buffer 32 of the agent port. The burst is not mirrored to the TX port, and does not circulate around the circular packet path.

In implementations in which step 98 is performed, CPU 40 typically waits until the entire packet burst is buffered in TX buffer 32 of the agent port, and then re-enables packet transmission (including mirroring) from the agent port, at a re-enabling step 106. From this point, the burst of packets repeatedly traverses the circular packet path in the agent port, while preserving the order of the packets in the burst. In addition, any packet exiting TX buffer 32 of the agent port is also mirrored to the TX port, and thus transmitted from the TX port, e.g., to the network.

The end result of the scheme of FIGS. 3 and 4 is similar to that of the scheme of FIGS. 1 and 2. The TX port transmits a periodic stream of packets that comprises successive repetitions of the packet burst. Transmission of the stream of packets continues until stopped, e.g., by the CPU.

As noted above, in some embodiments CPU 40 may add one or more packets to the burst at any suitable time, while the burst is already circling in the circular packet path and the packet stream is being transmitted.

Alternative Embodiments and Variations

Overcoming Latency of the Circular Packet Path

In some embodiments, the round-trip latency of the circular packet path may limit the bandwidth of the transmitted packet stream. In the scheme of FIG. 1, for example, the round-trip delay comprises the latency that a packet in the burst accumulates in its traversal through the TX buffer of the TX port, The TX buffer of the agent port and the RX buffer of the agent port (via loop 52), and back to the TX port. In the scheme of FIG. 3, the round-trip delay comprises the latency that a packet accumulates as it traverses the TX buffer and the RX buffer (via loops 52 and 84) in the agent port.

Consider, for example, an implementation in which the round-trip latency is 1 μSec and the wire-speed of the TX port is 100 Gbits/Sec (Gbps). In such a case, the round-trip latency of the circular packet path is equivalent to 12.5 KB of data at the wire-speed. In order not to limit the wire-speed when transmitting the packet stream, the initial burst of packets provided by CPU 40 should be at least 12.5 KB in size.

In some embodiments, CPU 40 ensures that the size of the packet burst is large enough not to limit the wire-speed. If not, CPU 40 replicates the burst until the size of the replicated burst does not limit the wire-speed. For example, assume that in the scenario above the initial packet burst comprises three packets {A, B, C} whose aggregate size is only 5 KB. In an embodiment, CPU replicates the burst three times, so that the burst that traverses the circular packet path is {A, B, C, A, B, C, A, B, C}. The aggregate size of the replicated burst is 15 KB, which is greater than 12.5 KB. By using the replicated burst, switch 20 is able to transmit the packet stream at the full 100 Gbps wire-speed of the TX port.

Random or Otherwise Variable Packet Attributes

In the embodiments described above, the packet stream transmitted from the TX port comprises multiple repetitions of the same initial burst of packets provided by CPU 40. In many practical scenarios, it is desirable to vary one or more packet attributes along the packet stream. For testing purposes, for example, it may be advantageous to diversify some packet header fields, such as the source or destination addresses specified in the packets. In various embodiments, CPU 40 applies various techniques to modify one or more packet attributes from one repetition of the burst to the next.

In some embodiments, relating to the switch configuration of FIG. 1, the TX port processes incoming packets (arriving via path 48 from the egress port) using an ingress Access Control List (ACL) before buffering the packets in the RX buffer. In particular, the ingress ACL supports rules that specify modification of packet fields. The ACL may be implemented, for example, using a Ternary Content-Addressable Memory (TCAM), or in any other suitable way.

In some embodiments, CPU 40 configures the TX port ingress ACL to modify a certain packet field to a random value. The packet field may comprise, for example, the Destination Medium Access Control (DMAC) address field or any other suitable field. The ACL may determine the random value in any suitable way, for example by running a Pseudo-Random Binary Sequence (PRBS) generator, or by taking several least-significant bits of a hardware timer.

In other embodiments, CPU 40 configures the ingress ACL of the TX port to modify packet fields in a stateful or deterministic manner. For example, the ACL may be configured to increment the DMAC from one packet to the next over a certain range. In one example, the burst of packets comprises four packets having DMAC addresses {100, 101, 102, 103}, and the ACL is configured to modify the ingress packets such that the packets in the transmitted packet stream have DMAC values of {100, 101, 102, 103, . . . , 198, 199, 100, 101, . . . }.

In one embodiment, CPU 40 achieves such a sequence by specifying the following one-hundred rules in the ACL:

If DMAC=100, set DMAC to 101
If DMAC=101, set DMAC to 102
If DMAC=102, set DMAC to 103
. . .
If DMAC=199, set DMAC to 100

In some practical cases, the above ACL may fail to apply the incrementing operation to each and every packet, due to the round-trip latency of the circular packet path. In the scenario above (100 Gbps wire-speed, 1 μSec round-trip latency), the packet stream may undesirably receive the DMAC values {100, 100, 100, 100, 101, 101, 101, 101, 102, 102 . . . }.

In an alternative embodiment that overcomes the above problem, CPU 40 configures the ACL with the following rules:

If DMAC=100, set DMAC to 104
If DMAC=101, set DMAC to 105
If DMAC=102, set DMAC to 106
If DMAC=103, set DMAC to 107

If DMAC=104, set DMAC to 108
If DMAC=105, set DMAC to 109
. . .
If DMAC=196, set DMAC to 100
If DMAC=197, set DMAC to 101
If DMAC=198, set DMAC to 102
If DMAC=199, set DMAC to 103

Thus, for example, a packet having DMAC=100 will first be modified to DMAC=104, and then to DMAC=108. A packet having DMAC=101 will first be modified to DMAC=105, and then to DMAC=109, and so on.

The above techniques can also be applied in the switch configuration of FIG. 3, by configuring an ingress ACL in the agent port. In alternative embodiments, the packet processing circuitry in switch 20 may use any other suitable technique for modifying any suitable packet field value between different occurrences of the packet burst in the packet stream.

Transmitting a Packet Stream Having a Controlled Number of Packets

In the embodiments described above, the packet stream is transmitted continuously from the TX port until stopped. In some embodiments, CPU 40 may stop the packet stream in various ways, e.g., by inhibiting transmission of the TX port or of the agent port, by stopping the mirroring operation, or by disrupting the circular packet path in any way.

In some cases, however, it may be desirable to generate an exact number of packets in the packet stream. In such cases, stopping the transmission using the CPU software may not be sufficiently accurate. Thus, in some embodiments CPU 40 configures a hardware component of switch 20 to stop transmission of the packet stream after a predefined number of packets.

In an example embodiment, the TX port comprises a counter that counts the number of transmitted packets. With reference to the scheme of FIG. 1, CPU 40 configures the ingress ACL in the TX port to look-up this counter, and stop transmission of the packet stream if the counter value indicates that the desired number of packets have been transmitted. With reference to the scheme of FIG. 3, CPU 40 may apply a similar configuration to the ingress ACL of the agent port.

In another example embodiment, CPU 40 may apply a packet shaper with rate=0 and burst_size=N, wherein N denotes the desired number of packets in the packet stream. After transmitting N packets, the burst has to be transmitted again from the CPU.

In any of the above examples, stopping transmission of the packet stream can be performed, for example, by inhibiting transmission of the TX port or of the agent port, by stopping the mirroring operation, or by disrupting the circular packet path in any way.

Further alternatively, CPU 40 may configure any other suitable hardware component in switch 20 to stop transmission of the packet stream after a predefined number of packets.

Generation of Multiple Packet Streams

In the embodiments described above, switch 20 comprises a single designated group of ports that is configured to generate a single packet stream. In alternative embodiments, CPU 40 may designate two or more such groups in switch 20, each group configured to generate a separate respective packet stream.

In an embodiment, referring to the switch configuration of FIG. 1, CPU 40 may designate multiple groups that share the same agent port. This scheme is useful, for example, when the desired transmission rate of each packet stream is low, such that a single agent port can support multiple TX ports. Consider, for example, a scenario in which switch 20 supports 100 Gbps, but the required rate of each packet stream is only 10 Gbps. In such a case, a single agent port can server up to ten TX ports, for generating up to ten respective packet streams. Each TX port in these examples generates its own packet stream, independently of the other TX ports.

In another embodiment, CPU 40 may configure a single designated group of ports to send the same packet stream via multiple ports. For example, as noted above with regard to the scheme of FIG. 3, CPU 40 may configure the agent port to send the packets using multicast to multiple TX ports. The multiple TX ports transmit the packets to the network. Multicast transmission may be implemented in any suitable way, e.g., using table lookup (e.g., by DMAC) or using a protocol such as OpenFlow.

The scheme of FIG. 1 can also be adapted, mutatis mutandis, to send the same packet stream via multiple TX ports. In an embodiment, one of the multiple TX port is also part of the circular packet path (together with the agent port). The other TX ports only receive the packet stream and send it to the network.

Generating Packet Stream Using a Single Port

In the embodiments described above, the designated group comprises two ports. In alternative embodiments, CPU 40 may designate and configure a single port to generate a packet stream. For example, CPU 40 may configure a certain port 24 to mirror (e.g., SPAN) packets from the output of its TX buffer 32 to the input of its RX buffer 36.

In one embodiment, such a single port may also support user traffic. In this embodiment, the port typically arbitrates between received test packets (mirrored packets belonging to the generated packet stream) and received user packets (arriving from the network). The arbitration scheme typically giving higher priority to the user packets relative to the test packets. Loopback checking should typically be disabled in this port.

Sharing the TX Port with User Traffic

In the example embodiments described above, the TX port is dedicated only to transmission of the generated packet stream. In alternative embodiments, CPU 40 configures the TX port to transmit and/or receive user packets (in addition to transmitting the generated packet stream).

Receiving user packets via the TX port is typically possible with no additional changes. For transmitting user packets via the TX port, CPU 40 may define different TX buffers 32 for the user packets and for the generated packets. The different TX buffers may be specified in terms of different traffic classes, different VLANs, or different priorities, for example.

It is typically desirable to give user packets higher priority than generated packets. Thus, in some embodiments CPU 40 may assign a lower-priority TX buffer (e.g., lower quality-of-service traffic class) to the packet stream, and a higher-priority TX buffer to the user packets. In these embodiments, the configurations related to the circular packet path (e.g., SPAN) need only be applied to the TX buffer assigned for the generated packets. Selective SPAN can be applied, for example, by specifying SPAN only for a specific TX buffer or a specific packet parameter (e.g., Source MAC address, Ethertype, or other suitable parameter).

When transmitting both a generated packet stream and user packets in the scheme of FIG. 1, a "starvation" scenario might occur due to the lower priority given to the generated packet stream. In such a case, the generated packets will be delayed and not transmitted, in favor of user packets. Such scenarios are typically temporary and are resolved within a short period of time. In some embodiments, the switch may carry out a process of actively identifying and resolving such starvation.

Additionally or alternatively, the switch may pre-allocate some bandwidth (e.g., 10%) to the generated packet stream, in order to avoid starvation in the first place. As another example, the switch may apply a shaping operation that limits the maximal rate of generating the packet stream, and thus assign the packet stream a relatively high priority.

Implementations without Local CPU

In the embodiments described above, the initial packet burst is provided to the designated group of ports by CPU 40. In alternative embodiments, the burst of packets is provided without involving the switch CPU, for example because the switch does not comprise a CPU or because the CPU is too weak for support these functions. In an example embodiment, the packet processing circuitry of the switch is configured to use one or more received packets (received from the network via one of the ports) as the burst of packets from which the packet stream is generated.

Implementations Involving Multiple Switches

In the embodiments described above, all the ports in the designated group belong to the same network switch 20. In alternative embodiments, the designated group of ports can be split between multiple switches, e.g., two switches. In an example embodiment (referring either to the scheme of FIG. 1 or to the scheme of FIG. 3), the TX port belongs to one switch 20, and the agent port belongs to a different switch 20. In such embodiments, some dedicated "virtual channel" is typically established between the two switches in order to transfer packets over the circular packet path. Such a virtual channel may be defined, for example, using a dedicated Class-of-Service (CoS), by dedicated packet wrapping (encapsulation), by a dedicated VLAN, or in any other suitable way.

The switch configurations shown in FIGS. 1 and 3 are example configurations, which are chosen purely for the sake of conceptual clarity. In alternative embodiments, any other suitable switch configuration can be used. In the present context, fabric 28 and CPU 40 are referred to collectively as "packet processing circuitry." The embodiments described herein describe a specific partitioning of tasks ("division of labor") between fabric 28 and CPU 40, purely by way of example. In alternative embodiments, any other suitable partitioning of tasks between the fabric and CPU can be used. Further alternatively, the packet processing circuitry may be implemented using any other suitable components.

Certain elements of switch 20, e.g., ports 24 and fabric 28, may be implemented using hardware/firmware, such as using one or more Application-Specific Integrated Circuits (ASICs) or Field-Programmable Gate Arrays (FPGAs). Alternatively, some switch elements, e.g., CPU 40, may be implemented in software or using a combination of hardware/firmware and software elements. TX buffers 32 and RX buffers 36, as well as other buffers or queues that may be part of fabric 28, may be implemented using any suitable type of solid-state memory.

Typically, CPU 40 comprises a general-purpose programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Further aspects of packet generation in network switched are addressed in U.S. patent application Ser. No. 15/186,557, filed Jun. 20, 2016, entitled "Generating high-speed test traffic in a network switch," which is assigned to the assignee of the present patent application and whose disclosure is incorporated herein by reference.

Although the embodiments described herein mainly address packet generation for test purposes, the methods and systems described herein can also be used for generating packets for any other suitable purpose, such as for transmitting "I am alive" packets from a network element, possibly with changing DMAC addresses. Although the embodiments described herein mainly address network switches, the methods and systems described herein can be implemented in other types of network elements such as routers, gateways or multi-port Network Interface Controllers (NICs).

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for packet generation, comprising:
configuring a first port of a network element including a plurality of ports, with a Tx-to-Rx loop which causes packets exiting a transmission buffer of the first port to be sent to an input of a receive buffer of the first port;
designating a group of one or more of the plurality of ports, including the first port, to operate;
a circular packet path that traverses one or more buffers of the ports in the group, wherein other than the first port, the circular packet path does not include any other ports configured with a Tx-to-Rx loop;
providing to the designated group a burst of one or more packets, so as to cause the burst of packets to repeatedly traverse the circular packet path; and
transmitting a packet stream, comprising the repeated burst of packets, from one of the plurality of ports of the network element.

2. The method according to claim 1, and comprising inhibiting packet transmission from the group before providing the burst to the group, and re-enabling the packet transmission after providing the burst.

3. The method according to claim 1, wherein configuring the circular packet path comprises:
configuring a second port in the group to duplicate and send duplicates of egress packets to the first port in addition to transmission of the egress packets by the second port; and
configuring the first port to forward packets from an output of a reception (RX) buffer of the first port to the second port.

4. The method according to claim 3, wherein configuring the second port to duplicate and send duplicates of egress packets comprises configuring the second port to mirror the egress packets.

5. The method according to claim 3, wherein configuring the second port to duplicate and send duplicates of egress packets comprises configuring the second port to mirror the egress packets.

6. The method according to claim 1, wherein configuring the circular packet path comprises:
configuring the first port to duplicate packets from an output of a reception (RX) buffer of the first port to a second port, in addition to having the packets flow to a transmission (TX) buffer of the first port.

7. The method according to claim 1, and comprising adding one or more packets to the burst, while the burst is traversing the circular packet path and the packet stream is being transmitted.

8. The method according to claim 1, wherein providing the burst comprises replicating the burst that is provided to the group, so as to transmit the packet stream at wire-speed.

9. The method according to claim 1, and comprising configuring the circular packet path to modify a packet field value between first and second occurrences of the burst in the packet stream.

10. The method according to claim 1, and comprising configuring a hardware component to stop transmission of the packet stream after a predefined number of packets.

11. The method according to claim 1, wherein designating the group comprises designating at least first and second groups of ports for generating multiple packet streams, such that at least a given port is shared between the first and second groups.

12. The method according to claim 1, wherein transmitting the packet stream comprises transmitting both the packet stream and user packets via a same port.

13. The method according to claim 12, and comprising applying to the packet stream a shaping operation that limits a maximal transmission rate of the packet stream.

14. The method according to claim 1, wherein the group consists of a single port.

15. The method according to claim 1, wherein transmitting the packet stream comprises arbitrating, in a given port of the group, between the packets of the packet stream and user packets.

16. The method according to claim 1, wherein configuring the circular packet path comprises configuring the first port to duplicate packets from an input of a transmission (TX) buffer of the first port to a second port, in addition to having the packets flow to the transmission (TX) buffer of the first port.

17. An apparatus for packet generation, comprising:
multiple ports belonging to one or more network elements; and
packet processing circuitry, configured to:
configure a first port of the multiple ports, with a Tx-to-Rx loop which causes packets exiting a transmission buffer of the first port to be sent to an input of a receive buffer of the first port;
designate a group of one or more of the multiple ports, including the first port, to operate a circular packet path that traverses one or more buffers of the ports in the group, wherein other than the first port, the circular packet path does not include any other ports configured with a Tx-to-Rx loop;
provide to the group a burst of one or more packets, so as to cause the burst of packets to repeatedly traverse the circular packet path; and
transmit a packet stream, comprising the repeated burst of packets, from one of the multiple ports.

18. The apparatus according to claim 17, wherein the packet processing circuitry is configured to inhibit packet transmission from the group before providing the burst to the group, and to re-enable the packet transmission after providing the burst.

19. The apparatus according to claim 17, wherein the packet processing circuitry is configured to configure the circular packet path by:
configuring a second port in the group to duplicate and send duplicates of egress packets to the first port in addition to transmission of the egress packets by the second port; and
configuring the first port to forward packets from an output of a reception (RX) buffer of the first port to the second port.

20. The apparatus according to claim 17, wherein the packet processing circuitry is configured to configure the circular packet path by:
configuring the first port to duplicate packets from an output of a reception (RX) buffer of the first port to a second port, in addition to having the packets flow to a transmission (TX) buffer of the first port.

21. The apparatus according to claim 17, wherein the packet processing circuitry is configured to add one or more packets to the burst, while the burst is traversing the circular packet path and the packet stream is being transmitted.

22. The apparatus according to claim 17, wherein the packet processing circuitry is configured to replicate the burst that is provided to the group, so as to transmit the packet stream at wire-speed.

23. The apparatus according to claim 17, wherein the packet processing circuitry is configured to configure the circular packet path to modify a packet field value between first and second occurrences of the burst in the packet stream.

24. The apparatus according to claim 17, wherein the packet processing circuitry is configured to configure a hardware component to stop transmission of the packet stream after a predefined number of packets.

25. The apparatus according to claim 17, wherein the packet processing circuitry is configured to designate at least first and second groups of ports for transmitting multiple packet streams, such that at least a given port is shared between the first and second groups.

26. The apparatus according to claim 17, wherein the packet processing circuitry is configured to transmit both the packet stream and user packets via a same port.

27. The apparatus according to claim 26, wherein the packet processing circuitry is configured to apply to the packet stream a shaping operation that limits a maximal transmission rate of the packet stream.

28. The method according to claim 17, wherein the group consists of a single port.

29. The apparatus according to claim 17, wherein the packet processing circuitry is configured to transmit the packet stream by arbitrating, in a given port of the group, between the packets of the packet stream and user packets.

30. A computer software product, the product comprising a tangible non-transitory computer-readable medium in which program instructions are stored, which instructions, when read by a processor in one or more network elements having multiple ports, cause the processor to:
- configure a first port of a network element including a plurality of ports, with a Tx-to-Rx loop which causes packets exiting a transmission buffer of the first port to be sent to an input of a receive buffer of the first port;
- designate a group of one or more of the plurality of ports, including the first port, to operate a circular packet path that traverses one or more buffers of the ports in the group, wherein other than the first port, the circular packet path does not include any other ports configured with a Tx-to-Rx loop;
- provide to the group a burst of one or more packets, so as to cause the burst of packets to repeatedly traverse the circular packet path; and
- transmit a packet stream, comprising the repeated burst of packets, from one of the plurality of ports in the network element.

\* \* \* \* \*